(12) United States Patent
Rama et al.

(10) Patent No.: US 11,697,758 B2
(45) Date of Patent: Jul. 11, 2023

(54) WETTABILITY MODIFICATION FOR ENHANCED OIL RECOVERY

(71) Applicant: Halliburton Energy Services, Inc., Houston, TX (US)

(72) Inventors: Mallikarjuana Shroff Rama, Pune (IN); Rajender Salla, Pune (IN); Ronald Glen Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/511,772

(22) Filed: Oct. 27, 2021

(65) Prior Publication Data
US 2022/0049151 A1    Feb. 17, 2022

Related U.S. Application Data

(62) Division of application No. 16/628,593, filed as application No. PCT/US2017/049541 on Aug. 31, 2017, now Pat. No. 11,186,762.

(51) Int. Cl.
  *E21B 43/16* (2006.01)
  *C09K 8/58* (2006.01)
  *E21B 43/34* (2006.01)
(52) U.S. Cl.
  CPC .............. *C09K 8/58* (2013.01); *E21B 43/168* (2013.01); *E21B 43/34* (2013.01)
(58) Field of Classification Search
  CPC .......... C09K 8/58; E21B 43/168; E21B 43/34
  See application file for complete search history.

(56) References Cited

U.S. PATENT DOCUMENTS

| 5,042,580 A | 8/1991 | Cullick et al. |
| 5,550,184 A | 8/1996 | Halling |
| 5,714,453 A | 2/1998 | Neumiller |
| 5,798,144 A * | 8/1998 | Varanasi ................. C04B 41/84 106/287.11 |
| 7,500,519 B2 | 3/2009 | Weaver et al. |
| 7,921,911 B2 | 4/2011 | Fuller et al. |
| 8,084,103 B2 | 12/2011 | Sakhrani et al. |
| 8,307,897 B2 | 12/2012 | Reyes et al. |
| 8,727,004 B2 | 5/2014 | Bull et al. |
| 8,991,499 B2 | 3/2015 | Nevison |

(Continued)

FOREIGN PATENT DOCUMENTS

| WO | 2011088556 | 7/2011 |
| WO | 2015195451 | 12/2015 |

OTHER PUBLICATIONS

ISRWO International Search Report and Written Opinion for PCT/US2017/049541 dated May 16, 2018.

(Continued)

*Primary Examiner* — Silvana C Runyan
(74) *Attorney, Agent, or Firm* — Thomas Rooney; C. Tumey Law Group PLLC

(57) ABSTRACT

A method of enhanced oil recovery may comprise placing into a subterranean formation a production enhancement fluid comprising a short chain hydrocarbon phase and a silane based wettability modifier, wherein the short chain hydrocarbon phase comprises hydrocarbons having 5 or less carbon atoms; allowing the production enhancement fluid to remain in the subterranean formation for a shut-in period; and producing hydrocarbons from the subterranean formation.

12 Claims, 1 Drawing Sheet

(56) References Cited

U.S. PATENT DOCUMENTS

| | | | |
|---|---|---|---|
| 9,487,692 | B2 | 11/2016 | Nguyen et al. |
| 2003/0220204 | A1* | 11/2003 | Baran, Jr. .............. B82Y 30/00 507/200 |
| 2004/0200618 | A1 | 10/2004 | Pickenbrock |
| 2007/0015669 | A1* | 1/2007 | Zhang ...................... F17D 1/17 507/200 |
| 2007/0029085 | A1 | 2/2007 | Panga et al. |
| 2010/0163234 | A1 | 7/2010 | Fuller et al. |
| 2010/0224361 | A1 | 9/2010 | Pope et al. |
| 2015/0218921 | A1* | 8/2015 | Suresh .................... E21B 43/20 166/305.1 |
| 2016/0068736 | A1 | 3/2016 | De Stefano et al. |
| 2016/0280985 | A1 | 9/2016 | Sarrda-Mantri et al. |
| 2017/0137696 | A1 | 5/2017 | Mohanty |

OTHER PUBLICATIONS

Nguyen, D., Wang, D., Oladapo, A., Zhang, J., Sickorez, J., Butler, R., & Mueller, B. (2014). Evaluation of Surfactants for Oil Recovery Potential in Shale Reservoirs. SPE Improved Oil Recovery Symposium.

Alvarez, J. O., & Schechter, D. S. (2016). Altering Wettability in Bakken Shale by Surfactant Additives and Potential of Improving Oil Recovery During Injection of Completion Fluids. SPE Improved Oil Recovery Conference.

Sheng, J., Sheng, J. J., & Li, L. (2016). A Comparison Study on Huff-n-Puff Gas Injection and Chemical Relative Permeability Modification to Mitigate Condensate Blocking in Fractured Shale Gas Condensate Reservoirs. SPE Low Perm Symposium. SPE-180201-MS 2016.

Peter M. Murphy* and Tracy Hewat, "Fluorosurfactants in Enhanced Oil Recovery" The Open Petroleum Engineering Journal, 2008, 1, 58-61.

M.S. Kanfar "Factors Affecting Hunn-n-Puff Efficiency in Hyraulically-Fractured Tight Reservoirs" 2017 SPE-185062-MS.

James J. Sheng, "Enhanced oil recovery in shale reservoirs by gas injection" Journal of Natural Gas Science and Engineering 22 (2015).

* cited by examiner

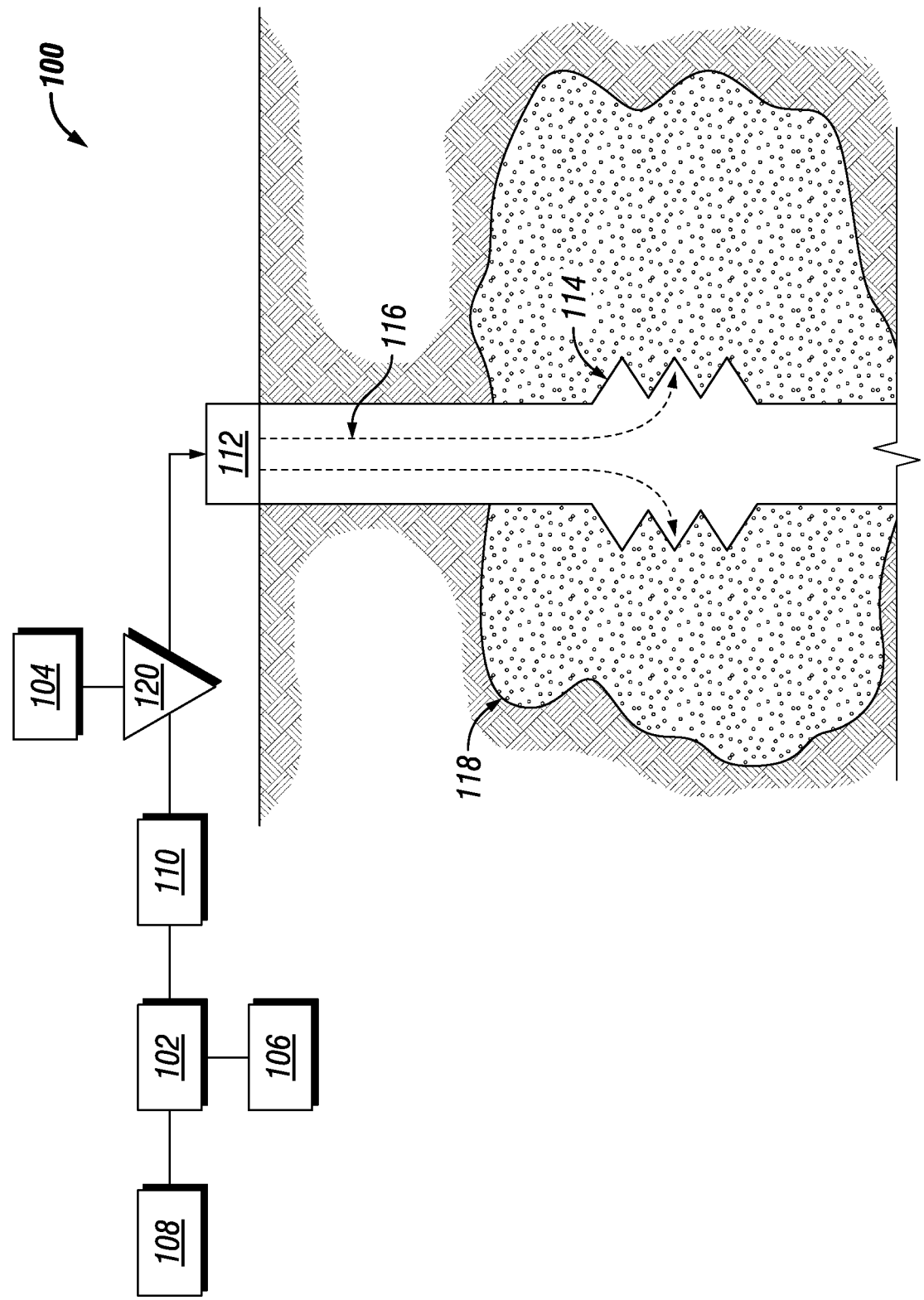

WETTABILITY MODIFICATION FOR ENHANCED OIL RECOVERY

BACKGROUND

During enhanced oil recovery (EOR) operations, small hydrocarbon gasses such as methane, ethane, and propane may be injected into a well to increase mobility of hydrocarbons trapped in the subterranean formation. Surfactants may be injected alongside the hydrocarbons to modify the subterranean formation faces to impart hydrophobic or hydrophilic properties. Surfactants can aid in production of oil and gas by allowing water and hydrocarbons to flow easier by disrupting the boundary layer created between water and oil. Conventional surfactants tend to be depleted over time as the surfactant molecules are produced alongside water and hydrocarbons. As such, the production rate may decrease over time due to decreased surfactant concentration.

BRIEF DESCRIPTION OF THE DRAWINGS

These drawings illustrate certain aspects of some of the embodiments of the present method, and should not be used to limit or define the method.

FIG. 1 is a schematic of a system for enhanced oil recovery.

DETAILED DESCRIPTION

The systems, methods, and/or compositions disclosed herein may relate to subterranean operations and, in some systems, methods, and compositions, to providing short chain hydrocarbons with a silane wettability modifier. The short chain hydrocarbons may include any suitable short chain hydrocarbons with five or less carbon atoms, including, but not limited to, methane, ethane, propane, butane, or pentane. Suitable short chain hydrocarbons may include natural gas, liquefied natural gas (LNG), or liquefied petroleum gas (LGP). As used herein, energized natural gas (ENG) refers to natural gas that has been pressurized.

To increase the amount of hydrocarbons extracted from subterranean formations, techniques such as enhanced oil recovery (EOR) may be used. Such techniques may be especially useful in shale formations, as the rate of recovery of liquid hydrocarbons may be lower compared to other types of formations. A shale formation may have extremely low permeability typically on the order of about $10^{-4}$ to about $10^{-10}$ millidarcy (mD) which can present challenges to flow of oil and gas. Hydraulic fracturing may increase the permeability of the subterranean formation by breaking apart the formation and creating fractures and flow paths for hydrocarbons. During fracturing, surfactants may be used to further increase the production capability of the formation.

An EOR technique may comprise injecting short chain hydrocarbons, such as natural gas, LNG, or LGP, into a subterranean formation to knock off adsorbed and absorbed hydrocarbons. Typically, short chain hydrocarbons such as methane, ethane, and propane may be injected as the smaller molecules may penetrate though narrow pore spaces. Short chain hydrocarbons may be necessary in tight formations with relatively low permeability such as shale formations.

One EOR technique that may be used with the disclosed silane wettability modifier may be referred to as "huff-and-puff." Huff and puff refers to the cyclic EOR technique of injecting a recovery enhancement fluid, such as short chain hydrocarbons, into the subterranean formation during the "huff" stage. The injected short chain hydrocarbons may be allowed to sit in the formation during a soaking or resting period before the well is put back into production during the "puff" stage. Short chain hydrocarbons injected are believed to help increase mobility by miscibility in the adsorbed hydrocarbons to enhance recovery. Injected short chain hydrocarbons may improve the mobility of oil in the reservoir (condensing mechanism) or vaporize the intermediate hydrocarbons into the gas phase (vaporizing mechanism) which may help produce more oil at the surface. The cycle of injection and production may then be repeated as needed. Utilizing short chain hydrocarbons may have several advantages over other huff-and-puff methods. For example, when the short chain hydrocarbons are liquefied natural gas (LNG), the natural gas may be supplied to the wellbore at a much higher rate thereby enabling shorter injection cycles. In some huff-and-puff applications, the short chain hydrocarbons may be injected for a period of about 2-5 days followed by a shut in period of about 1 to 2 weeks. Alternatively, the shut in period may be from about 1 day to about 30 days. After the shut in period, the well may be produced until pressure drops off below a predetermined limit. In some applications, the process may repeat with injection of the short chain hydrocarbons about every 100 to 500 days. The use of ENG may be particularly advantageous in a huff-and-puff application as the energy contained in ENG may help in displacing and knocking off relatively strongly adsorbed liquid hydrocarbons from the rock surfaces.

Imbibition refers to the absorption of a wetting phase into a porous rock. Imbibition may be an important factor in the ability of hydrocarbons to move through the reservoir because imbibition may promote or hinder hydrocarbon movement in the formation. If hydrocarbons are strongly imbibed into a rock, the hydrocarbons may be less likely to flow though the formation to a wellbore. If the opposite is true where a rock strongly imbibes water, hydrocarbons may more easily flow. Some rocks may imbibe both water and oil, with water imbibing at low in situ water saturation, thereby displacing oil from the surface of the rock grains. The same rock may be oil imbibing at low in situ oil saturation there by displacing excess water. In general, improving the water imbibition properties of a rock may increase hydrocarbon production by absorbing excess water into the rock and allowing oil to flow freer.

Water-wet and oil-wet may refer to the preference of a solid to be in contact with a water-rich phase or an oil-rich phase respectively. In an oil-wet condition, a coating of oil may cover the surface of solid or rock. Oil-wet rocks may preferentially imbibe oil. Some wellbore conditions may increase the oil-wetness of a rock such as polar compounds and asphaltene deposits onto mineral surfaces. Other conditions such as exposure to oil-based drilling mud may also create an oil-wet condition. In a water-wet condition, rocks may be covered in water and may preferentially imbibe water. Water-wet conditions are desirable for efficient hydrocarbon transport. Wettability may be a function of surface forces and interfacial forces Several treatments exist to modify the surface chemistry of formations to increase the water wetting potential of a rock. Surfactants have been used during all stages of production to promote water wetting of the formation and increase production. Surfactants may also enhance oil displacement by weakly emulsifying or dissolving adhered hydrocarbons and knocking off adhered hydrocarbons from formation surfaces. Surfactants may be lost over time due to production of the injected surfactants alongside hydrocarbons. The gradual loss of surfactants may lead to decreased production over time as the rocks become more oil-wet and oil imbibing.

Presently, water imbibition treatments may be performed from an injector well where a fluid containing a surfactant that promotes water imbibition is injected. The injected fluid "sweeps" the hydrocarbons in the formation to a production well. Typically surfactants such as anionic surfactants, non-ionic surfactants, and nanoparticle surfactants have been used as wettability modifiers in such applications. These treatments suffer drawbacks such as short timeframes for wettability modification. The surfactants are loosely bound to the formation rocks and are easily displaced and produced alongside hydrocarbons leading to a need to continually introduce surfactants to keep production up.

The present disclosure utilizes short chain hydrocarbons with a silane-based wettability modifier in EOR applications, such as huff-and-puff, to provide long term wettability modification. Huff-and-puff may be advantageous as compared to other EOR methods such as sweeping as previously described. Huff-and-puff allows the production enhancement fluid and the silane based surface wettability modifier to be injected though the same well as where production takes place. This may reduce the cost and complexity of an EOR operation as the need for multiple wells may be eliminated. Furthermore, the silane based wettability modifiers may increase the water imbibition of the formation and enhance the water-wetting properties so that hydrocarbons may more easily be produced.

As previously described, conventional surfactants may be readily produced alongside hydrocarbons thereby reducing the effectiveness of the surfactants over time. The silane based wettability modifiers alter the surface chemistry of the formation to allow for better binding of a surfactant to the formation faces and fractures as compared to a production enhancement fluid that does not comprise the complexing agent.

The chemistry or geochemical surface composition of a hydrocarbon-bearing reservoir may be inadequate or incompatible for a surfactant to bind to. Altering the geochemical surface of the reservoir may provide a better binding site for a surfactant. Altering the surface may comprise forming a silica bond to the geochemical surface. The silica bond may be formed between a reactive site on the silane based wettability modifier and the geochemical surface. Binding the surfactant to the wettability modifier may decrease the migration potential of the surfactant throughout production.

The surface wettability modifier may be silane based and water soluble. The silane based wettability modifiers of the present disclosure may comprise a silicon atom, a hydrophobic group, and a reactive group. Silane based wettability modifiers may be advantageous as compared to other surfactants as the reactive group may react with the surface of a formation to bond the silane based wettability modifier molecule to the surface to prevent migration of the molecule during production. The silane based wettability modifiers may be used in any formations but may be particularly effective in formations comprising quartz and silicates as the reactive groups may form a silica bond with the formation. Chemical formulae 1 and 2 below provide examples of silane based wettability modifiers:

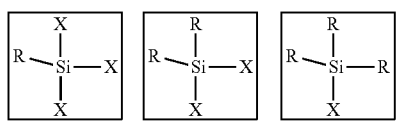

(1)

Wherein R is a hydrophobic group and X is a reactive group.

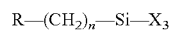

(2)

Wherein R is a hydrophobic group, X is a reactive group, and n is an integer ranging from about 1 to about 15.

Chemical formula 1 depicts a suitable silane based wettability modifier. The silane based wettability modifier may comprise a silicon atom bonded to a hydrophobic group (R) and a reactive group (X). The hydrophobic group may comprise a linear or branched chain hydrocarbon with a length of about 1 carbon to about 15 carbons. The hydrophobic group may further comprise any other hydrocarbon functional groups such as, without limitation, alkyl, alkene, alkyne, aromatics, aldehydes, alcohols, amines, ketones, esters, amides, amines, organo-halides, ethers, and combinations thereof. The reactive group may comprise any suitable reactive group that can form a silica bond. Examples of reactive groups may include, but are not limited to, methoxy, ethoxy, other alkoxy groups, halide, and combinations thereof.

Another suitable silane based wettability modifier is depicted in chemical formula 2. The silane based wettability modifier may comprise a silicon atom bonded to an a reactive group (X) and a linker group $(CH_2)_n$ of length n wherein the linker group is bonded to an organofunctional group (R). The reactive groups may be any of the previously mentioned reactive group. The organofunctional group may comprise any suitable functional group including, but not limited to, alkyl and other hydrophobic groups.

Another suitable silane based wettability modifier is provided in chemical formula 3, as follows:

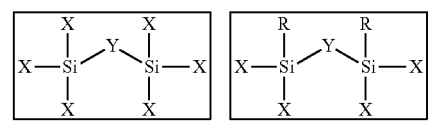

(3)

Wherein R is a hydrophobic group, X is reactive group, and Y is a spacer group. Chemical formula 3 depicts a dipodal silane wettability modifier. The dipodal silane based wettability modifier may comprise a silicon atom bonded to a hydrophobic group (R), a reactive group (X), and a hydrophobic spacer group (Y). The hydrophobic spacer group comprise any suitable spacer group including, but not limited to, methylene, ethylene, $(CH_2)_n$ groups, polyoxy ethylene, polyoxypropylene, and combinations thereof. The hydrophobic groups and reactive groups may be any previously described hydrophobic and reactive groups.

Additional specific examples of suitable silane based wettability modifiers are depicted in chemical formulae 4-8 as follows:

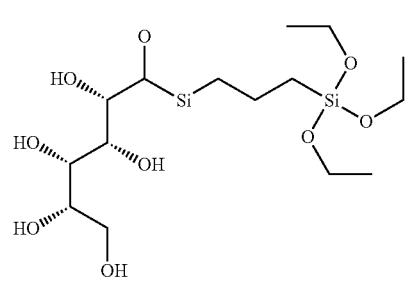

(4)

-continued

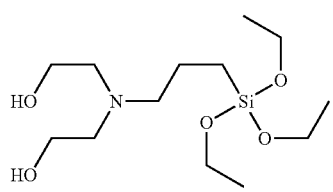

(5)

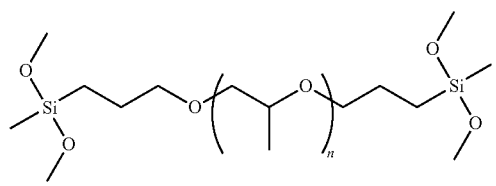

(6)

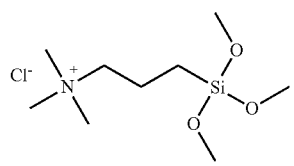

(7)

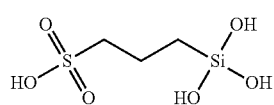

(8)

As previously described, during EOR a production enhancement fluid may be injected into a subterranean formation using the huff-and-puff method. A production enhancement fluid may comprise a short chain hydrocarbon phase (e.g., energized natural gas, liquefied natural gas, liquefied petroleum gas) and a silane based wettability modifier. The production enhancement fluid may be foamed, wherein the short chain hydrocarbon phase may be in a gaseous state entrained in a liquid. The silane based wettability modifier may be present in the production enhancement fluid in any suitable amount, including, but not limited to, an amount of about 0.001% to about 5% by weight. Suitable amounts of the silane based wettability modifier may include, but are not limited to 0.001%, 0.01%, 0.1%, 1%, 2%, 3%, 4%, or 5% by weight. The short chain hydrocarbon phase may be present in the production enhancement fluid in any suitable amount, including, but not limited to, an amount of about 1% to about 95% by weight. Suitable amounts of the short chain hydrocarbon phase may include, but are not limited to, 1%, 5%, 10%, 20%, 40%, 60%, 80%, 90%, or 95% by weight.

Where natural gas is used as the short chain hydrocarbon phase, a natural gas stream for EOR may be provided as a gas and at pressure and rate sufficient to support an EOR operation of a particular subterranean formation. The natural gas stream may be blended with a liquid comprising the silane based wettability modifier to form a production enhancement fluid. The natural gas stream may be further combined with other additives such as a rheology modifier, a friction reducing polymer, a surfactant, or a complexing agent. Hydraulic energy needed to drive the production enhancement fluid into the subterranean reservoir may be obtained from pressurization of the gaseous natural gas and the liquid additive at surface. Following the EOR treatment, the natural gas and accompanying additives may be recovered and the applied natural gas directed to facilities for recovery and sale.

As used herein, natural gas means methane ($CH_4$) alone or blends of high concentration of methane (>85% by weight) with other gases such as other gaseous hydrocarbons. Natural gas is often a variable mixture of about 85% to 99% methane ($CH_4$) by weight and 5% to 15% ethane ($C_2H_6$) by weight, with further decreasing components of propane ($C_3H_8$), butane ($C_4H_{10}$), pentane ($C_5H_{12}$), and their isomers, with traces of longer chain hydrocarbons. Natural gas, as used herein, may also contain inert gases such as carbon dioxide and nitrogen in varying degrees.

As used herein, liquefied petroleum gas means hydrocarbons in a liquid that primarily comprises propane, propylene, butane, and/or butylene in various mixtures. The liquefied petroleum gas should comprise C3 and C4 hydrocarbons in a concentration of greater than 95% by weight.

An EOR system may include equipment for storing the components of the production enhancement fluid, equipment for injecting the production enhancement fluid into a subterranean formation, such as an oil well or a gas well, and equipment for recovering and separating fluids and gasses produced from the well. In some examples, the short chain hydrocarbon phase comprises compressed natural gas (CNG) held in pressurized vessels with a pump further compressing the natural gas to a suitable fracturing pressure. In other examples, the compressed natural gas may be held in pressurized vessels above the EOR pressure and released into a gas blending stream. In some embodiments, the short chain hydrocarbon phase may be a vessel containing LNG or LGP with the pump pressuring the LNG or LPG to EOR pressure and heating the pressurized LNG or LPG stream. A natural gas source may also be from a pipeline or another gas well.

Efficient storage of gaseous phase natural gas may be achieved at the highest possible pressure which is typically less than 30 MPa (4,400 psi). Pressurization of the natural gas to the extremes typically needed for EOR can be accomplished with the feed in a gaseous phase. Gas phase compressors may be used to pressurize the gas to about 48 MPa (7000 psi), or greater, which may be suitable for EOR. In some applications, the pressure may start out relatively lower, about 14 MPa (2000 psi), and increase to about 70 MPa (10,000 psi). The pressure for each well may be different depending on well depth and initial reservoir conditions.

Production enhancement fluids containing a short chain hydrocarbon phase may improve production from the well after treatment. Using short chain hydrocarbons avoids fluid incompatibilities often found with the use of carbon dioxide or nitrogen as the EOR fluid. Upon completion of the EOR treatment, the short chain hydrocarbons may be recovered with the production enhancement fluid and the reservoir oil and/or gas. The injected short chain hydrocarbons may be recovered within the existing oil and/or gas processing system with little or no disturbance to normal operations. Further, using short chain hydrocarbons in the production enhancement fluid may enable application of a locally available natural gas to gain the benefit of a gasified production enhancement fluid stream without the extensive logistics often associated with nitrogen or carbon dioxide.

A number of specific methods pertain to safely and reliably applying short chain hydrocarbons in the form of LNG. Methods using LNG for on-site storage may permit considerable volumes to be stored efficiently and at pressures as low as atmospheric. As a cryogenic liquid one unit volume of LNG contains approximately six hundred volumes of gas at atmospheric conditions. Thus, fewer storage vessels and a much lower storage and feed pressure with reduced flow volumes is required compared to compressed natural gas. Similarly, pressuring natural gas to the pressures encountered EOR in liquid form as LNG is exceptionally efficient. Again, as a liquid the volumetric rates are much reduced and relatively incompressible as compared to compressed natural gas, compression heating is eliminated and equipment size and numbers drastically reduced. This significantly reduces the complexity of the operation removing many of the costs and hazards which would be present with known techniques. Further, with fewer pieces of equipment operating at lower pressures with fewer connections between equipment, the needed simplicity for movement of the equipment between wells is supported with LNG use. An inert cryogenic gas at a temperature near or below that of the liquefied natural gas may be used to quickly, efficiently and safely pre-cool the natural gas pumper and heater to operating temperature prior to introducing the cryogenic LNG. This eliminates or minimizes use of LNG for cool down thereby avoiding the unnecessary flaring and potential safety issues around cooling the system with the flammable liquefied gas. On-site pressure integrity of the cryogenic liquefied natural gas pumping and heating system may be maximized by combining the pumping and heating system on a single unit that. LNG storage tanks are designed to operate under elevated pressures to eliminate or minimize vent gases during storage. The elevated pressure capacity also allows for boost pressurization during LNG withdrawal from the storage tanks at fracturing rates thereby assisting feed to the LNG pumps. As a side stream, vapor from the LNG fracturing pump may be directed, as needed to the LNG storage tanks to maintain vessel pressure and create the boost. Energy for heating of the LNG can be acquired in a number of ways, where a preferred embodiment employs heat that is generated without a flame. Such heat for a portable unit can be acquired from the environment, waste or generated heat from internal combustion engine, a catalytic burner or an electric heating element. Alternatively, heat can be generated using a flame based heat source local to the heater or remote to the process as dictated by safety requirements.

Optionally, a carrier fluid may be combined with the short chain hydrocarbon phase. Suitable carrier fluids that may be combined with the short chain hydrocarbon phase may comprise an aqueous fluid or hydrocarbon liquid. The short chain hydrocarbon phase may present in a gaseous phase, wherein the short chain hydrocarbon phase may be entrained in the carrier fluid. Alternatively, the short chain hydrocarbon phase may in a liquid phase that is mixed with the carrier fluid. The silane based wettable modifier may be included in the liquid combined with the short chain hydrocarbon phase. The carrier fluid may be present in the production enhancement fluid in any suitable amount, including, but not limited to, an amount of about 20% to about 90% by weight. Suitable amounts of the carrier fluid may include, but are not limited to 20%, 30%, 40%, 50%, 60%, 70%, 80%, or 90% by weight.

As previously mentioned, the carrier fluid may include a hydrocarbon liquid or an aqueous fluid. Suitable aqueous fluids may include, but are not limited to freshwater, saltwater, and brines, among others. Suitable hydrocarbon liquids may include, but are not limited to, olefins, kerosene, diesel oil, gas oil (also known as gas condensate), fuel oil, other petroleum distillates, and certain mixtures of crude oil. Non-limiting examples of suitable carrier fluids may include, but are not limited to, aqueous fluids, slickwater fluids, aqueous gels, hydrocarbon gels, acidic fluids, viscoelastic surfactant gels, foamed gels, and emulsions, for example. Suitable slickwater fluids are generally prepared by addition of small concentrations of polymers to water to produce what is known in the art as "slick-water." Suitable aqueous gels are generally comprised of an aqueous fluid and one or more gelling agents. Suitable hydrocarbon gels are generally comprised of a hydrocarbon liquid and one or more gelling agents. Suitable emulsions may be comprised of two immiscible liquids such as an aqueous fluid or gelled fluid and a hydrocarbon. Foams may be created by the addition of a gas, such as carbon dioxide, nitrogen, and natural gas. In some embodiments, the liquid additive may comprise a foaming agent which when mixed with the natural gas generates a foam which is subsequently injected into the wellbore and subterranean formation.

The carrier fluid may further comprise additional components including, but not limited to, a salt; a weighting agent; an inert solid; a fluid loss control agent; an emulsifier; a dispersion aid; a corrosion inhibitor; an emulsion thinner; an emulsion thickener; a viscosifying agent; a high-pressure, high-temperature emulsifier-filtration control agent; a surfactant; a particulate; a lost circulation material; a foaming agent; a gas; a pH control additive; a breaker; a biocide; a crosslinker; a stabilizer; a scale inhibitor; a mutual solvent; an oxidizer; a reducer; a friction reducing polymer; a clay stabilizing agent, a consolidating agent and any combination thereof. The additional components may be present in any weight percent in the carrier fluid.

The carrier fluid may additionally comprise a silicone composition comprising a mixture of: (a) an addition-curable silicone prepolymer; and (b) at least one polymerizable hydrophilic modifier that is a functional hydrophilic polysiloxane having the general formula:

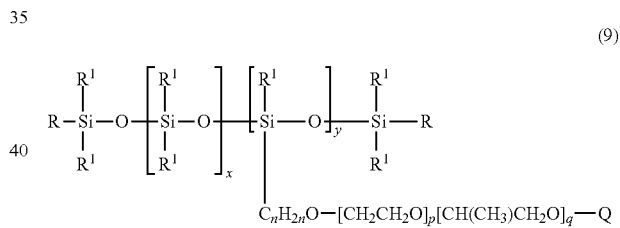

(9)

Wherein functional group R is a vinyl group or a hydrogen atom; $R^1$ is a $C_1$ to $C_8$ univalent hydrocarbon radical; Q is a hydrogen atom or a monovalent hydrocarbyl radical; n is an integer greater than or equal to three; x is an integer greater than or equal to zero; y is an integer greater than or equal to one; p is an integer greater than or equal to one; and q is an integer greater than or equal to zero.

Additionally, the carrier fluid may comprise Silane tetrakis (trifluoromethyl); Silane tetrakis (nonafluorobutyl); Silane, (nonafluorobutyl); Silane dimethylbis (trifluoromethyl); Silane, (difluoromethyl) (fluoromethyl)methyl(trifluoromethyl); Silane, bis(difluoromethyl)bis(fluoromethyl); Silane, (3,3,3-trifluoro-2-(trifluoromethyl)propyl); Silane, trimethyl(trifluoromethyl); Silane, trifluoro(1-methylpropyl); Silane, (difluoromethyl) (fluoromethyl) dimethyl; Silane, tris(fluoromethyl)methyl; Silane, (1,1-dimethylethyl)trifluoro; Silane, trifluoro(2-methylpropyl); Silane, methyl(3,3,3-trifluoropropyl); Silane, butyltrifluoro; and combinations thereof.

In some examples, the amount of an element of the carrier fluid may vary during pumping. By way of example, changing the amount of an element in the carrier fluid may be an increase or decrease as a stepwise change, a gradient change, or any combination thereof. In some embodiments, where multiple elements are introduced simultaneously, the amount of one or more elements may change during the step. In some embodiments, the amount of element(s) may stay constant while the amount of other additive(s), including those described above, are changed. In some embodiments, both the amount of element(s) and additive(s) may change within a step. In some embodiments, an element may be introduced into the well bore after the well bore pressure increases and begins to level off. In some embodiments, an element may be introduced into the well bore during substantially steady-state well bore pressure.

Additionally, the carrier fluid may comprise an acid. Any acid may be suitable for use in the production enhancement fluids described herein that is able to generate a pH of two (2) or lower given the other components in the production enhancement fluid. Suitable examples include hydrochloric acid, formic acid, methanesulfonic acid, chloroacetic acid (mono-, di-, tri-), trifluoroacetic acid, acetic acid, sulphonic acid. If an acid has a pKa value of greater than two, then such acid would not be suitable for use. When mixing the fluid, for example, in a mixing tank at a well site, the amount of acid to include in a given treatment fluid depends on the other components being used in the fluid, such as the chelating agent, and it will be driven by the need to keep the fluid at a pH of 2 or less. Additional considerations as to how much acid to include are that the fluid should have a sufficient amount of acid to dissolve the desired amount of the matrix thus generating metal cations (e.g., calcium out of the carbonate formation) to allow a sufficient amount of the aggregate blocking agents to form as described above. For instance, at least in some embodiments, to have optimum formation of the aggregate blocking agents, at least 22,000 ppm of calcium ions should be present in situ. To generate this amount of calcium ions, the treatment fluid should have an acid concentration of at least 0.6 Molar. As used herein the term "Molar" is used in its ordinary meaning to refer to solution of concentration 1 mol/L.

Additionally, the carrier fluid may comprise a chelating agent, such as an aminopolycarboxylic acids. A number of aminopolycarboxylic acids may be suitable for use as the chelating agent in the production enhancement fluids and methods described herein. A number of these aminopolycarboxylic acids may be biodegradable, which is preferable for environmental reasons. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life. In this regard, suitable aminopolycarboxylic acid chelating agents may include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxyl)ethyl]glycine (BCA6), N-bis[2-(1,2-dicarboxyethoxyl)ethyl]aspartic acid (BCA5), N-bis[2-(1,2-dicarboxyethoxyl)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof that is soluble in a pH range of 0 to 2. In some embodiments, as an alternative to or in addition to the aminopolycarboxylic acid chelating agents, traditional chelating agents such as, for example, propylenediaminetetraacetic acid (PDTA), hydroxyethyliminodiacetic acid (HEIDA), diphenylaminesulfonic acid (DPAS), any salt thereof, any derivative thereof, or the like, may be included in the treatment fluids described herein. Particularly suitable biodegradable chelating agents that may be used in the treatment fluids described herein include, for example, MGDA, GLDA, HIDS, EDDS, β-ADA, IDS, TCA6, BCA3, BCA5, BCA6, MCBA3, and MCBA5.

In general, some acids may not be suitable for use in the present compositions. Some of these acids may include phosphoric acid, sulfuric acid, hydrofluoric acid and some phosphonic acids. These acids may lead to irreversible, unmanageable side reactions and problems.

Additionally, the carrier fluid may comprise a friction reducing polymer may be used. The friction reducing polymer may be included in the aqueous additive to form a slickwater fluid. The friction reducing polymer may be a synthetic polymer. The friction reducing polymer may be an anionic polymer or a cationic polymer, in accordance with particular embodiments. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof. Some friction reducing polymers may be in an acid form or in a salt form. A variety of salts may be prepared, for example, by neutralizing the acid form of the acrylic acid monomer or the 2-acrylamido-2-methylpropane sulfonic acid monomer. In addition, the acid form of the polymer may be neutralized by ions present in the treatment fluid. Indeed, as used herein, the term "polymer" in the context of a friction reducing polymer, is intended to refer to the acid form of the friction reducing polymer, as well as its various salts.

Where used, the friction reducing polymer may be included in the aqueous fluid, for example, in an amount equal to or less than 0.2% by weight of the water present in the aqueous fluid. In some embodiments, the friction reducing polymers may be included in embodiments of the aqueous additive in an amount sufficient to reduce friction without gel formation upon mixing. By way of example, the aqueous fluid comprising the friction reducing polymer may not exhibit an apparent yield point. While the addition of a friction reducing polymer may minimally increase the viscosity of the liquid additive, the polymers are generally not included in the example liquid additive in an amount sufficient to substantially increase the viscosity.

As previously described, the production enhancement fluids may be gelled, for example, to increase viscosity. In some embodiments, the short chain hydrocarbon phase itself may be gelled to provide or enhance the total fluid viscosity. In order to gel LPG, for example, a gelling agent may be added. Any gelling agent known by those skilled in the art to be suitable for gelling hydrocarbon based fluids may be suitable for gelling the LPG. Suitable gelling agents for use in the production enhancement fluids may include ferric iron or aluminum polyvalent metal complexes of orthophosphoric acid esters, or ferric iron or aluminum polyvalent metal complexes of alkylphosphonic acid esters, or ferric iron or aluminum polyvalent metal complexes of unsymmetrical dialkylphosphinic acids or mixtures thereof. The rate of viscosity increase can be governed to some degree by the choice of the polyvalent salt. The ferric based salts have been found to result in a more rapid increase in viscosity of LPG compared to the aluminum based salts which permits a more readily controlled on-the-fly mixing process to be used in handling the LPG. Where used, the gelling agent may be added to the production enhancement fluids in an amount sufficient to provide the desired degree of gelling based, inter alia, on the specific gelling agent used. Suitable amounts of the gelling agents may include, but are not limited to, an amount of from about 0.1% to about 2.5% by weight of LPG present in the production enhancement fluid.

Alternatively, the hydrocarbon phase may be gelled by the addition of a viscoelastic surfactant, Suitable viscoelastic surfactants that may be utilized include, but are not limited to, non-ionic surfactants, cationic surfactants, anionic surfactants, or amphoteric surfactants. Examples of suitable non-ionic surfactants may include, but are not limited to, hydrofluoroether surfactants, alkyl sarcosinate, alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkyl benzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated, propoxylated sulfated dodecyl phenols, alpha-olefin sulfonates, and other petroleum sulfonates. Examples of non-limiting suitable cationic surfactants may include methylpolyoxyethylene octadecanammonium chloride, methylpolyoxyethylene cocoalkylammonium chloride, isotridecyloxypropyl polyoxethylene methyl ammonium chloride, polyoxyethylene cocoalkylamines, polyoxyethylene tallowalkylamines, diallyl dimethyl ammonium chloride, N,N,N,trimethyl-1-octadecamonium chloride, and polyoxyethylene oleylamines. Examples of suitable anionic surfactants may include, but are not limited to, sodium xylenesulfonate. Examples of suitable amphoteric surfactants may include, but are not limited to, betaines such as cocamidopropyl betaines, alkyl betaines, alkyl amidopropyl betaines oleoamidopropyl betaines, and other amphoteric surfactants such as dihydroxyl alkyl glycinate, alkyl ampho acetate or propionate, and alkylamino mono- or di-propionates. Examples of co-surfactants and additives to enhance surfactant performance may include quaternary amines, organic acids, and organic acid salts. Such co-surfactants and additives may include octanol, octanoic acid, ethoxylated carboxylates, alkyl dimethyl benzyl ammonium chloride, sodium dodecylbenzenesulfonate, sodium dodecylsulfate, lauryl alcohol, lauric acid, sodium oleate, oleic acid, and sodium salicylate.

An example of a suitable production enhancement fluid may be foamed and comprise an aqueous fluid, a short chain hydrocarbon gaseous phase entrained in the aqueous fluid and a silane based wettability modifier, wherein the short chain hydrocarbon gaseous phase is present in an amount of about 1% to about 20% by weight of the production enhancement fluid, wherein the short chain hydrocarbon gaseous phase comprises natural gas, wherein the silane base wettability modifier is present in an amount of about 1% to about 5% by weight of the production enhancement fluid, and wherein the silane base wettability modifier is of equation 2, wherein n ranges from 1 to 10, R is a C2 to C10 alkyl group, and X is a methoxy or ethoxy group. Another example of a suitable production enhancement fluid may comprise liquefied natural gas and a silane modifier of equation (2) or (3) in an amount of about 1% to about 5% by weight of the production enhancement fluid.

FIG. 1 illustrates a generic depiction of the main components of an EOR system 100. It should be understood that the EOR system 100 depicted on FIG. 1 is merely an example and other configurations of the EOR system 100 may be used in accordance with the present disclosure. A blender 102 may blend an aqueous fluid 106 comprising the silane based wettability modifier and additional aqueous additives 108 which may be conveyed to pump 110. Pump 110 may increase the pressure of the fluid to at or above the EOR treatment pressure. A natural gas source 104 may be combined with the effluent stream from the pump in mixer 120 to make the production enhancement fluid. Production enhancement fluid may be conveyed to wellhead 112 and into wellbore 116. The production enhancement fluid may enter subterranean formation 118 through perforations 114.

Accordingly, this disclosure describes systems, methods, and compositions that may relate to subterranean operations. The systems, methods, and compositions may further be characterized by one or more of the following statements:

Statement 1. A method of enhanced oil recovery, the method comprising: placing into a subterranean formation a production enhancement fluid comprising a short chain hydrocarbon phase and a silane based wettability modifier, wherein the short chain hydrocarbon phase comprises hydrocarbons having 5 or less carbon atoms; allowing the production enhancement fluid to remain in the subterranean formation for a shut-in period; and producing hydrocarbons from the subterranean formation.

Statement 2. The method of statement 1, wherein the production enhancement fluid further comprises a silicon compound and water.

Statement 3. The method of statement 1 or 2, wherein the silane based wettability modifier comprises a silicon atom, a hydrophobic group, and a reactive group.

Statement 4. The method of any preceding statement, wherein the reactive group comprises a methoxy group, an ethoxy group, a halide, or combinations thereof.

Statement 5. The method of any preceding statement, further comprising allowing the reactive group to form a silica bond with one or more minerals in the subterranean formation.

Statement 6. The method of statement 5, wherein the subterranean formation has greater water imbibition properties as compared to the same subterranean formation that does not have silica bonds with the reactive group.

Statement 7. The method of statement any preceding statement, wherein the shut-in period of about 1 days to about 30 days, and wherein the method further comprises separating the natural gas from the hydrocarbons produced from the subterranean formation after the step of producing hydrocarbons.

Statement 8. The method of any preceding statement, wherein the short chain hydrocarbon phase comprises at least one component selected from the group consisting of natural gas, liquefied natural gas, and liquefied petroleum gas.

Statement 9. The method of any preceding statement, wherein production enhancement fluid is foamed and further comprises an aqueous fluid, wherein the short chain hydrocarbon phase is in a gaseous state and is entrained in the aqueous fluid, wherein the short chain hydrocarbon phase comprises natural gas, wherein the short chain hydrocarbon phase is present in an amount of about 1% to about 20% by weight of the production enhancement fluid, wherein the silane based wettability modifier is present in an amount of about 1% to about 5% by weight of the production enhancement fluid, and wherein silane based wettability modifier is of formula (2), wherein n is an integer ranging from 1 to 10, R is a C2 to C10 alkyl group, and X is a methoxy or ethoxy group.

Statement 10. A method of enhanced oil recovery, the method comprising: mixing a natural gas and an aqueous fluid comprising a silane based wettability modifier to form a production enhancement fluid; introducing the production enhancement fluid into a subterranean formation penetrated by a wellbore; allowing the silane based wettability modifier to react with the subterranean formation; and producing hydrocarbons from the subterranean formation.

Statement 11. The method of statement 10, wherein the production enhancement fluid further comprises a silicon compound, and water Statement 12. The method of statement 10 or 11, wherein the silane based wettability modifier comprises a silicon atom, a hydrophobic group, and a reactive group.

Statement 13. The method of any one of statements 10 to 12, wherein the reactive group comprises a methoxy group, an ethoxy group, a halide, or combinations thereof Statement 14. The method of any one of statements 10 to 13, wherein a reaction product of the reaction of the silane based wettability modifier and the subterranean formation comprises a silica bond, wherein the subterranean formation has greater water imbibition properties as compared to the same subterranean formation that has not undergone a reaction with a silane based wettability modifier.

Statement 15. The method of any one of statements 10 to 14, wherein the method is repeated on the same subterranean formation about every 100 to 500 days.

Statement 16. The method of any one of statements 10 to 15, further comprising separating the natural gas from the produced hydrocarbons after the step of production Statement 17. A production enhancement fluid, fluid comprising: a short chain hydrocarbon phase comprising hydrocarbons having 5 or less carbon atoms; water; and a silane based wettability modifier.

Statement 18. The fluid of statement 17, wherein the silane based wettability modifier comprises a silicon atom, a hydrophobic group, and a reactive group.

Statement 19. The fluid of statement 18, wherein the reactive group comprises a methoxy group, an ethoxy group, a halide, or combinations thereof.

Statement 20. The fluid of any preceding statement, wherein the silane based wettability modifier is present in an amount of about 0.001% to about 5% by weight of the fluid.

It is also to be recognized that the disclosed fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A production enhancement fluid, the fluid comprising:
    short chain hydrocarbon phase comprising hydrocarbons having 5 or less carbon atoms;
    an aqueous fluid; and
    a silane based wettability modifier, wherein the silane based wettability modifier comprises a combination of:

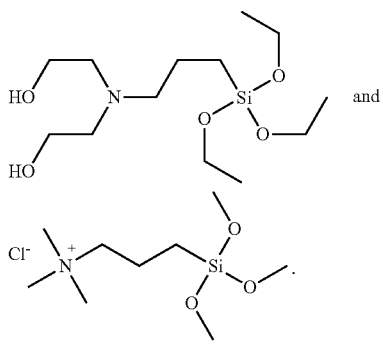

and

2. The fluid of claim 1, further comprising an additional silane based wettability modifier wherein the additional silane based wettability modifier comprises a silicon atom, a hydrophobic group, and a reactive group.

3. The fluid of claim 2, wherein the reactive group comprises a methoxy group, an ethoxy group, a halide, or combinations thereof.

4. The fluid of claim 1, wherein the silane based wettability modifier is present in an amount of about 0.001% to about 5% by weight of the fluid.

5. The production enhancement fluid of claim 1, wherein the production enhancement fluid further comprises a silicon compound and water.

6. The production enhancement fluid of claim 1, wherein the short chain hydrocarbon phase comprises at least one component selected from the group consisting of natural gas, liquefied natural gas, liquefied petroleum gas, and combinations thereof.

7. The production enhancement fluid of claim 1, wherein the short chain hydrocarbon phase is present in an amount of about 1% to about 20% by weight of the production enhancement fluid.

8. The production enhancement fluid of claim 1, wherein the silane based wettability modifier is present in an amount of about 1% to about 5% by weight of the production enhancement fluid.

9. The production enhancement fluid of claim 1, further comprising an additional silane based wettability modifier wherein the additional silane based wettability modifier has the following formula:

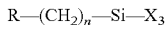

wherein n is an integer ranging from 1 to 10, R is a C2 to C10 alkyl group, and X is a methoxy or ethoxy group.

10. The production enhancement fluid of claim 1, wherein the silane based wettability modifier further comprises at least one additional wettability modifier i-s-selected from the group consisting of:

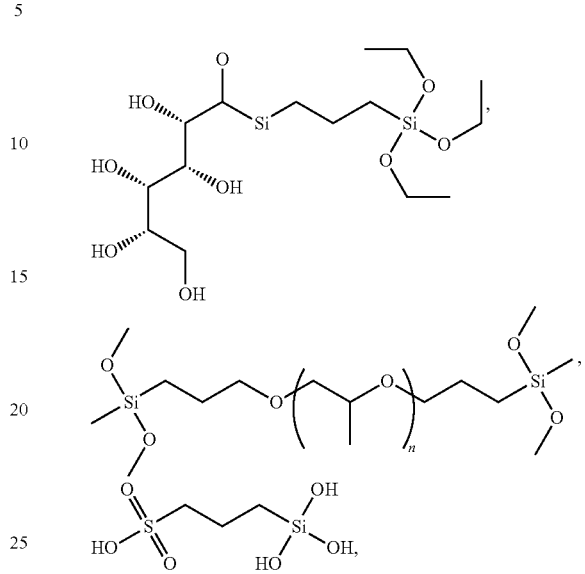

and combinations thereof.

11. A production enhancement fluid comprising:
    short chain hydrocarbon phase comprising hydrocarbons having 5 or less carbon atoms;
    an aqueous fluid comprising freshwater, saltwater, or a brine; and
    a silane-based wettability modifier, wherein the silane based wettability modifier is present in an amount of about 0.001% to about 5% by weight of the fluid, and wherein the silane based wettability modifier comprises a combination of:

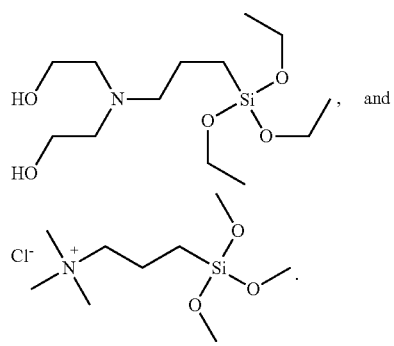

, and

12. The production enhancement fluid of claim 11, wherein the short chain hydrocarbon phase comprises at least one gas selected from the group consisting of natural gas, liquefied natural gas, and liquefied petroleum gas.

* * * * *